April 24, 1951     E. F. ALLBERT     2,550,104
REGULATING GENERATOR CONTROL SYSTEM
Filed Jan. 25, 1947
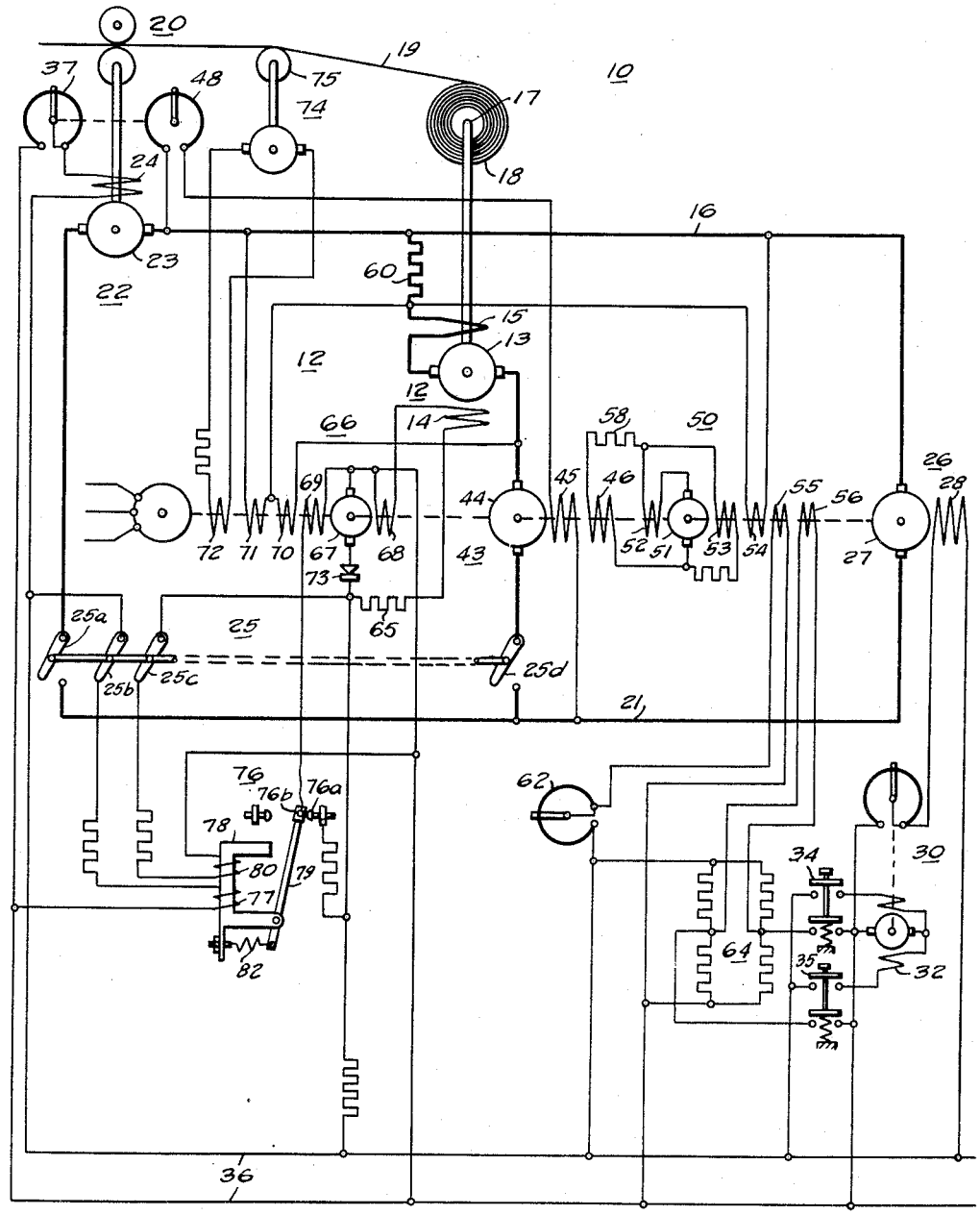
WITNESSES:
E. A. McCloskey
G. V. Gislma
INVENTOR
Eugene F. Allbert.
BY
G. M. Crawford
ATTORNEY Patented Apr. 24, 1951

2,550,104

UNITED STATES PATENT OFFICE 2,550,104

REGULATING GENERATOR CONTROL SYSTEM

Eugene F. Allbert, Turtle Creek, Pa., assignor to Westinghouse Electric Corporation, East Pittsburgh, Pa., a corporation of Pennsylvania Application January 25, 1947, Serial No. 724,440

11 Claims. (Cl. 242—75)

1

My invention relates, generally, to control systems, and it has reference in particular to regulating generator control systems for use with reel systems and the like.

Generally stated, it is an object of my invention to provide an improved control system for a reel device, which is simple and inexpensive to manufacture, and is reliable and efficient in operation.

More specifically, it is an object of my invention to provide for changing the field strength of a reel drag generator at the end of a reeling operation so as to prepare the generator for a succeeding operation.

Another object of my invention is to provide for detuning a tuned regulating generator to vary the output of the regulating generator at the end of an unwinding operation, so as to prepare a reel control dynamoelectric machine for a subsequent reeling operation.

Yet another object of my invention is to provide in a reel control system for detuning a tuned regulating generator at the end of one unwinding operation so as to permit the output voltage thereof to increase to the value necessary for conditioning a reel drag generator for commencing a subsequent unwinding operation.

It is an important object of my invention to provide in a reel control system for disconnecting the anti-hunt field winding of a regulating generator so as to make the excess ampere turns of the self-energizing field winding effective to build up the generator voltage to a predetermined value.

Still another object of my invention is to provide in a reel control system for using a differential switch device for disconnecting the anti-hunt field winding of a regulating generator under predetermined conditions, and for reconnecting said winding when the voltage of the regulating generator builds up to a predetermined value which provides the full field condition required for the reel drag generator at the commencement of an unwinding operation.

Other objects will, in part, be obvious, and will, in part, be explained hereinafter.

In practicing my invention in one of its forms, the armature current of an entry reel drag generator in a reel control system is regulated to maintain a predetermined value of strip tension. The field current of the reel generator is regulated by a regulating generator which is normally differentially responsive to the speed of the strip and to the armature voltage of the reel generator. A differential control switch is used to disconnect the anti-hunt field winding of the regulating generator so as to permit the output voltage thereof to build up when voltage is removed from the reel generator armature circuit at the end of an unwinding operation, and to reconnect the

2 anti-hunt field winding when the voltage of the regulating generator reaches a predetermined value, whereby the reel generator is conditioned for commencing a subsequent unwinding operation.

For a more complete understanding of the nature and scope of my invention, reference may be made to the following detailed description which may be read in connection with the accompanying drawing, in which the single figure is a diagrammatic view of a reel control system embodying my invention in one of its forms.

Referring to the single figure of the drawing, the reference numeral 10 may denote, generally, a reel control system wherein a dynamoelectric machine such as, for example, a reel drag generator 12, having an armature 13 with a main field winding 14 and a compensating field winding 15, may be connected in driving relation with an entry reel 17 to provide for unwinding a coil 18 of strip material 19 which is disposed to be worked upon by the rolls of a roll stand 20 provided with a roll or mill motor 22 having an armature 23 and a field winding 24.

The armature 23 of the roll motor 22 may be connected by a switch 25 and main mill bus conductors 16 and 21 to a suitable source of variable voltage, such as a main generator 26, having an armature 27 and field winding 28. The voltage of the main generator 26 may be varied by varying the energization of the field winding 28 by means of a motor operated rheostat 30 having an operating motor 32 which may be operated in the forward and reverse directions by control means such as the "raise" and "lower" push-button switches 34 and 35, respectively. The field winding 24 of the mill motor 22 may be energized from a suitable source of electrical energy represented by the control bus conductors 36. A rheostat 37 may be provided for varying the energization of the field winding 24.

The armature 13 of the drag generator 12 may be energized from the mill bus conductors 21 and 24 through contact member 25d of the switch 25. The voltage applied to the armature 13 may be regulated to maintain a predetermined value of armature current, by utilizing a booster generator 43 having an armature 44 with a main field winding 45 and a regulating field winding 46. The main field winding 45 may be connected between the mill bus conductors 16 and 21 so as to provide a base energization which is proportional to the voltage applied to the armature of the mill motor 22. A rheostat 48 may be connected in circuit relation with the field winding 45, and operatively connected to the rheostat 37 of the mill motor field winding, so as to provide for further varying the energization of the field winding 45 in accordance with the speed of the mill motor, when the speed thereof is varied by control of its field strength.

Energization of the regulating field winding 46 of the booster generator may be controlled from a tension regulating generator 50 having an armature 51 with a self-energizing field winding 52, and anti-hunt field winding 53, a control or differential control winding 54, a pattern field winding 55, and an inertia compensating field winding 56.

The self-energizing field winding 52 may be connected in series circuit relation with the armature 51, the regulating field winding 46 and a control resistor 58, so as to provide a predetermined excess of ampere turns over the effective ampere turns necessary to overcome the air-gap magnetomotive losses of the regulating generator and provide a "tuned" operating condition. Under a "tuned" condition, the effective ampere turns of the self-energizing field winding 52 will be effective to maintain the output voltage of the regulating generator at any value which results when the magnetomotive forces of the pattern and control field windings are balanced.

The anti-hunt field winding 53 may be connected in shunt circuit relation with the regulating field winding 46 of the booster generator so as to be responsive to the voltage applied thereto. This field winding should be so connected as to oppose the excess ampere turns of the self-energizing field winding mentioned above, and neutralize them under normal or stable operating conditions. Under transient operating conditions the anti-hunt field winding produces additional ampere turns which oppose those of the self-energizing field winding, and tend to stabilize the operation of the generator.

The control or differential field winding 54 may be connected so as to be energized in accordance with the armature current of the reel generator 12 and, it may be connected, for example, across a shunt or control resistor 60 in series circuit relation with the armature 13 of the reel generator. The control winding should be so connected as to be differential with respect to the pattern field winding 55, which may be energized from a suitable source of control voltage such as the control bus conductors 36. A rheostat 62 may be connected in circuit relation with the pattern field winding 55 for varying the energization thereof to determine the value of armature current of the reel generator at which the magnetomotive force of the control field winding 54 will balance that of the pattern field winding 55.

The inertia compensating field winding 56 may be connected in a bridge circuit 64, the impedances of which may be varied upon operation of the "raise" and "lower" push-button switches 34 and 35, so as to make the field winding 56 differential and cumulative with respect to the pattern field winding 55, during acceleration and deceleration of the mill, respectively.

The field winding 14 of the drag generator 12 may be energized from a build-up regulating generator 66 having an armature 67, a self-energizing field winding 68 of the series type, anti-hunt field winding 69 of the shunt type, a control or differential field winding 70, an IR compensating field winding 71, and a pattern field winding 72.

The self-energizing field winding 68 may be connected in series circuit relation with the armature 67, the field winding 14, a control resistor 65 which is provided for adjusting the armature circuit to a "tuned" condition, and a rectifier device 73 which prevents any reversal of the armature current. The self-energizing field winding 68 may be arranged to provide an excess of ampere turns over those required for the "tuned" condition, and this excess may be normally neutralized by means of the anti-hunt field winding 69, which may be connected in opposed relation, in shunt circuit relation with the reel generator field winding 14.

The control field winding 70 may be connected in shunt circuit relation with the armature 13 of the reel generator so as to be energized in accordance with the terminal voltage thereof.

The IR compensating field winding 71 may be so connected across the resistor 60, that the net magnetomotive effect of this field winding and the control field winding 70 may be proportional to the electromotive force of the armature 13, and therefore to the speed of the reel generator.

The pattern field winding 72 may be energized from a pilot generator 74, which may be driven from a pilot roll 75 so as to produce a voltage proportional to the speed of the strip 19.

In order to provide for transferring the reel generator 12 from the weak field condition which exists at the end of an unwinding operation, to the full field condition which exists at the commencement of an unwinding operation, means such as the control switch 76 may be provided. The control switch 76 may be of the differential type, having an operating winding 77 positioned on a core member 78 for actuating an armature 79 to separate contact members 76a and 76b when the switch 25 is operated to disconnect the armature 13 of the reel generator and the armature 23 of the roll motor from the mill bus conductors at the end of a winding operation. A differential winding 80 may also be provided on the core members 78 for opposing the effects of the operating winding 77, whenever the voltage of the regulating generator 66 builds up to the predetermined value necessary to provide a full field for the reel generator 12.

In normal operation, the switch 25 will be actuated to the closed position so that contact arms 25a and 25d connect the armatures 23 and 13 respectively, across the mill bus conductors 16 and 21. The regulating generator 50 controls the output voltage of the booster generator 43 so as to maintain the armature current of the reel generator 12 at the predetermined value for which the tension control rheostat 62 may be adjusted. The regulating generator 66 controls, and gradually decreases the energization of the field winding 14 of the reel generator 12 as the diameter of the coil 18 on the reel 17 decreases, so that the generator may run at a higher speed as the strip unwinds, without increasing the drag which it asserts on the strip.

At the end of an unwinding operation, the switch 25 will be actuated to the position shown, so as to disconnect the armatures 13 and 23 from the mill bus conductors 16 and 21 and stop the mill. The operating winding 77 of the control switch 76 is thereupon connected to the control bus conductors 36 through contact arm 25b, while the differential winding 80 is connected to the armature 67 through contact arm 25c. The control switch operates in response to energization of the winding 77 since the voltage applied to the differential winding 80 is relatively low, and disconnects the anti-hunt field winding 69 of the regulating generator 66. The excess ampere turns of the self-energizing field winding 68 over those necessary to just maintain the output voltage of the regulating generator 66, will now be effective to cause the voltage of the regulating generator 66 to build up, since the pattern, control and IR compensating field winding are all deenergized.

When the voltage of the regulating generator reaches a high enough value to provide a "full" field on the reel generator 12, the ampere turns of the differential field winding 80 of the control switch, which is connected across the armature 67, neutralize the ampere turns of the field winding 77, and the armature 79 thereupon returns to the deenergized position under the action of the spring 82. This reconnects the anti-hunt field winding 69 across the armature 67. Under this condition, the excess of the ampere turns of the self-energizing field winding 68 over those of the anti-hunt field winding 69 will again be just sufficient to maintain the output voltage of the regulating generator 66 at the desired value, so that the regulating generator is again "tuned," and is ready for a subsequent unwinding operation.

From the above description and the accompanying drawing, it will be seen that I have provided in a simple and effective manner for controlling the operation of a regulating generator which governs a reel generator in a reel control system, so as to effect a rapid transfer between successive reeling operations. While the invention has been described in connection with an entry reel which is operatively connected to a reel drag generator which retards the reel while the strip is unwinding, it is to be understood that the invention is not limited to this application. It may also be applied to delivery reels in which the reel is connected to a reel motor which drives the reel for winding the strip therein, by using a differential switch which operates to increase the effectiveness of the self-energizing winding of a regulating generator controlling the reel motor when the end of a winding operation is reached, and which operates to restore the normal ampere turns whenever the voltage of the regulating generator has dropped to the desired value.

Since certain changes may be made in the above-described construction, and different embodiments of the invention may be made without departing from the spirit and scope thereof, it is intended that all the matter contained in the above description and shown in the accompanying drawing, shall be considered illustrative and not in a limiting sense.

I claim as my invention:

1. In a control system for a dynamo-electric machine having an armature and a field winding, circuit means supplying electrical energy to the armature, a regulating generator connected for energizing the field winding, and control means responsive to a reduction in the supply of electrical energy to the armature below a predetermined level and responsive to the output of the regulating generator operable to vary the output of the generator within predetermined limits.

2. In a control system for a dynamo-electric machine having a field winding and an armature arranged in driving relation with a reel device for handling a strip of material, circuit means including switch means operable for energizing and deenergizing the armature, a regulating generator connected for normally energizing the field winding in accordance with the diameter of a coil of strip of material on the reel, and control means operable in response to operation of the switch means to effect a reduction in the energization of the armature effective to change the energization of the field winding until the output voltage of the regulating generator reaches a predetermined level.

3. In a control system for a dynamo-electric machine having a field winding and an armature connected in driving relation with a reel device for unwinding a strip of material, circuit means including a booster generator responsive to the armature current of said dynamo-electric machine connected to energize said armature, circuit means including a regulating generator differentially responsive to the speed of the strip and the speed of the dynamo-electric machine connected to vary the energization of the field winding between full and empty reel conditions, and control means operable upon the termination of one reeling operation to initiate a change in the output of the regulating generator to condition the dynamo-electric machine for commencing a subsequent operation, said control means being responsive to said conditioning of the dynamo-electric machine to terminate said change in regulating generator output when the output reaches a predetermined value.

4. The combination with a dynamo-electric machine having a field winding and an armature arranged to control a reel device for a strip of material of circuit means including a booster generator and a regulating generator responsive to the armature current of the dynamo-electric machine connected to effect energization of said armature, switch means connected in circuit relation with said circuit means, an additional regulating generator differentially responsive to the speed of the strip and the speed of the reel device connected to energize the field winding of the dynamo-electric machine, said additional regulating generator having a tuned armature circuit including a series field winding of the self-energizing type and an opposing anti-hunt field winding which normally provide sufficient ampere turns to maintain the output under balanced conditions, and control means responsive to operation of the switch means to effect the termination of a reeling operation effective to detune the regulating generator and vary the output voltage until the output voltage thereof reaches a predetermined value.

5. In a control system for a dynamo-electric machine having a field winding and an armature operatively connected with a reel device for a strip material; circuit means including a regulating generator connecting the armature to a source of electrical energy for maintaining a predetermined flow of armature current; switch means connected in circuit relation with the armature; an additional regulating generator connected to effect energization of said field winding in accordance with the diameter of a coil of the strip material on the reel device, said additional regulating generator being provided with pattern and control field windings energized in opposite senses in accordance with the speed of the strip and the speed of the dynamo-electric machine, respectively, and having self-energizing and anti-hunt field windings energized in opposite senses in accordance with the regulating generator armature current and output voltage, respectively, to normally provide a sufficient magnetomotive force for maintaining the output of said regulating generator when the pattern and control field magnetomotive forces are balanced; and additional switch means operable when the switch means is operated to reduce the energization of the armature of the dynamo-electric machine below a predetermined value to vary the relative effectiveness of the self-energizing and anti-hunt field windings, and vary the output voltage of said regulating generator, said additional switch means being responsive to the output voltage of the regulating generator to restore the self-energizing and anti-hunt field winding magnetomotive forces to their normal relationship when the output voltage reaches a predetermined value.

6. The combination with a drag generator having a field winding and an armature operatively connected to an entry reel device, of circuit means including a booster generator and a regulating generator responsive to the armature current of the drag generator connecting said armature to a source of electrical energy for maintaining a predetermined value of armature current, switch means connected in circuit relation with said circuit means, control means including an additional regulating generator connected to energize the drag generator field winding, said additional regulating generator being normally responsive to the diameter of a coil of material on the reel device and having a series type self-energizing field winding and a shunt type anti-hunt field winding energized in opposite senses so as to normally provide for maintaining the output of said regulating generator for a given coil diameter, and additional switch means responsive to operation of said switch means to effect the termination of a reeling operation operable to disconnect the anti-hunt field winding, said additional switch means being responsive to the output voltage of said regulating generator to reconnect the anti-hunt field winding when the output voltage reaches a value necessary to provide a full field on the drag generator.

7. A control system for reel drag generator having an armature and a field winding, comprising control means including a booster generator connecting the armature to a source of electrical energy, switch means connected in circuit relation with said armature and source, a regulating generator controlling the output voltage of the booster generator, said regulating generator being responsive to the armature current of the drag generator, circuit means connecting the drag generator field winding to a source of electrical energy to provide a minimum safe value of field current, an additional regulating generator normally responsive to the diameter of a coil of material on the reel connected to control the energization of said field winding, and additional switch means responsive to operation of said switch means effective to vary the response of the additional regulating generator and increase the output voltage thereof when the switch means operates to reduce the energization of the armature to a predetermined level, said additional switch means being also responsive to the energization of the field winding so as to effect a cessation of increase in the output voltage when the energization of the field winding reaches a predetermined value.

8. In a control system for a reel drag generator having an armature and a field winding, circuit means connecting the armature to a source of electrical energy, a regulating generator connected to energize the field winding having a plurality of field windings energized in opposite senses for determining the energization of the drag generator field winding, and switch means operable when the energization of the drag generator is reduced below a predetermined level to vary the output of the regulating generator by varying the effectiveness of one of said field windings from a normal level, said switch means being responsive to the output of said regulating generator to restore said one field winding to its normal effectiveness when the output reaches a predetermined level.

9. In a control system for a dynamo-electric machine having an armature and a field winding, circuit means energizing the armature, a regulating generator connected to vary the energization of the field winding normally in one direction from a given value, in accordance with a predetermined pattern, and control means operable to reverse the direction of variation of said energization, said control means being operable to terminate said reversal when the energization of said field winding reaches said given value.

10. In a control system, a regulating generator having an armature connected to energize a load and having pattern and control field windings energized in opposite senses to determine the energization of said load, said generator having a self-energizing type of series field winding normally effective to compensate for the air-gap magnetomotive losses of the generator and maintain the output voltage of the generator under balanced conditions of the pattern and control field windings, and control means operable to vary the effectiveness of the self-energizing field winding from normal to change the output of the generator under said balanced conditions, said control means being responsive to the output of the generator to restore the normal effectiveness of the self-energizing field winding.

11. A control system comprising; a regulating generator having an armature connectable to energize a load and having pattern and control field windings energizable in opposed senses to normally determine the output of the generator, said generator being provided with a self-energizing field winding energizable in accordance with the armature current of the generator to provide more than sufficient magnetomotive force to compensate for the air-gap losses of the generator, and a differential field winding normally neutralizing said excess of magnetomotive force; and switch means operable to reduce the effectiveness of the differential field winding and thereby increase the output of the generator, said switch means being responsive to the output of the generator to restore the effectiveness of said differential field winding when the output of the generator reaches a predetermined value.

EUGENE F. ALLBERT.

REFERENCES CITED

The following references are of record in the file of this patent:

UNITED STATES PATENTS

| Number | Name | Date |
|---|---|---|
| 1,839,922 | Huston | Jan. 5, 1932 |
| 1,852,819 | Mohler | Apr. 5, 1932 |
| 2,246,294 | Cook | June 17, 1941 |
| 2,305,937 | Montgomery et al. | Dec. 22, 1942 |